United States Patent [19]

Joynes et al.

[11] Patent Number: 5,372,225

[45] Date of Patent: Dec. 13, 1994

[54] AUDIO AND VIDEO CABLE STORAGE ORGANIZER

[76] Inventors: Lance R. Joynes; Sandra M. Hilgarth, both of 308 Bedford Ct., Quakertown, Pa. 18951

[21] Appl. No.: 179,132

[22] Filed: Jan. 10, 1994

[51] Int. Cl.$^5$ .............................................. H02G 11/02
[52] U.S. Cl. ............................. 191/12.2 R; 273/148 B
[58] Field of Search .................... 191/12 R, 12.2 R; 273/148 B, DIG. 21; 362/387; 439/578, 579, 580, 581; 242/17

[56] References Cited

U.S. PATENT DOCUMENTS

| | | | |
|---|---|---|---|
| 2,678,779 | 5/1954 | Bellmer | 191/12.2 R |
| 3,821,496 | 6/1974 | Malone | 191/12.2 R |
| 4,735,377 | 4/1988 | Zuehsow | 191/12.2 R X |
| 4,853,500 | 8/1989 | Tydlacka | 191/12 R |
| 5,168,969 | 12/1992 | Mayhew | 191/12.2 R |

FOREIGN PATENT DOCUMENTS

| | | | |
|---|---|---|---|
| 4322116 | 11/1992 | Japan | 191/12.2 R |
| 1479999 | 5/1989 | U.S.S.R. | 191/12 R |

*Primary Examiner*—David A. Bucci
*Assistant Examiner*—Scott L. Lowe
*Attorney, Agent, or Firm*—Gary Alan Culliss

[57] ABSTRACT

An organizer for storing excess audio and video cable. The storage device includes a housing within which a plurality of reels are rotatably mounted. Each of the reels stores thereon a length of cable which may be extended therefrom through a slot in the housing and connected to an electrical device, such as a cable box, a VCR, or the like. The cables are electrically connected through a switching arrangement which allows operation of selected devices in the absence of other devices. An auxiliary input for connecting video games to the television and audio cable storage reels are also included.

7 Claims, 3 Drawing Sheets

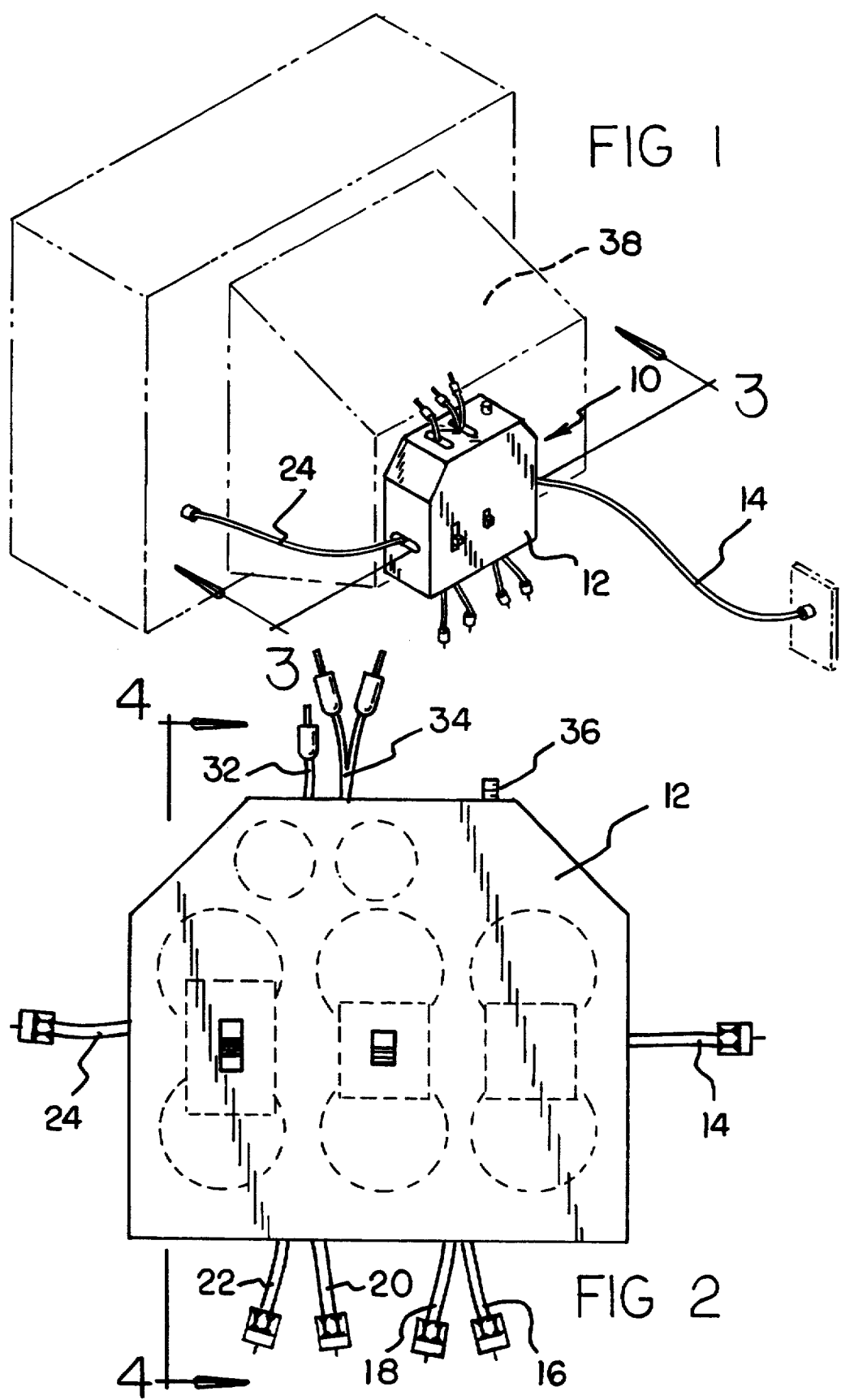

AUDIO AND VIDEO CABLE STORAGE ORGANIZER

BACKGROUND OF THE INVENTION

1. Field of the Invention

The present invention relates to reel storage devices and more particularly pertains to an audio and video cable storage organizer for storing excess audio and video cable within a housing.

2. Description of the Prior Art

The use of reel storage devices is known in the prior art. More specifically, devices heretofore devised and utilized for the purpose of storing cable are known to consist basically of familiar, expected and obvious structural configurations, notwithstanding the myriad of designs encompassed by the crowded prior art which have been developed for the fulfillment of countless objectives and requirements.

For example, a junction bus for cable connections is disclosed in U.S. Pat. No. 5,068,495 which is particularly suited for cable conduits. The junction box is designed as an equipment box for cable conduits and has a bottom, and at least one lateral wall in which is provided a slot for insertion of a cable.

Another patent of interest is U.S. Pat. No. 5,024,608 which illustrates a connection device for a coaxial cable and a corresponding connection module. The connection device comprises a link tube having one formed end dimensioned to receive and hold one end of a coaxial cable whose covering is stripped so as to allow electrical contact to be made between the peripheral conductor of the cable, and a fixed link conducting part provided with a connection head for receiving and holding the stripped central conductor of the cable. The connection module comprises a link tube having both ends provided with respective connection devices to couple two of such cables together.

Other known prior art interconnection devices include U.S. Pat. No. 3,654,570; U.S. Pat. No. 4,406,512; and U.S. Pat. No. 3,488,759.

While these devices fulfill their respective, particular objectives and requirements, the aforementioned patents do not disclose an organizer for storing excess audio and video cable which includes a housing within which a plurality of reels are rotatably mounted, with each of the reels being operable to store thereon a length of cable that may be extended therefrom through a slot in the housing and connected to an electrical device. Furthermore, none of the known prior art reel storage devices teach or suggest a storage organizer of the aforementioned structure which further includes a switching arrangement that allows operation of selected devices in the absence of other devices, an auxiliary input for connecting video games to the television, and audio cable storage reels for storing interconnected audio cable.

In these respects, the audio and video cable storage organizer according to the present invention substantially departs from the conventional concepts and designs of the prior art, and in so doing provides an apparatus primarily developed for the purpose of storing excess audio and video cable within a housing upon a plurality of reels.

SUMMARY OF THE INVENTION

In view of the foregoing disadvantages inherent in the known types of reel storage devices now present in the prior art, the present invention provides a new audio and video cable storage organizer construction wherein the same can be utilized for storing audio and video cable within a housing upon a plurality of rotatably mounted reels. As such, the general purpose of the present invention, which will be described subsequently in greater detail, is to provide a new audio and video cable storage organizer apparatus which has many of the advantages of the reel storage devices mentioned heretofore and many novel features that result in a audio and video cable storage organizer which is not anticipated, rendered obvious, suggested, or even implied by any of the prior art reel storage devices, either alone or in any combination thereof.

To attain this, the present invention generally comprises an organizer for storing excess audio and video cable. The storage device includes a housing within which a plurality of reels are rotatably mounted. Each of the reels stores thereon a length of cable which may be extended therefrom through a slot in the housing and connected to an electrical device, such as a cable box, a VCR, or the like. The cables are electrically connected through a switching arrangement which allows operation of selected devices in the absence of other devices. An auxiliary input for connecting video games to the television and audio cable storage reels are also included.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new audio and video cable storage organizer apparatus which has many of the advantages of the reel storage devices mentioned heretofore and many novel features that result in a audio and video cable storage organizer which is not anticipated, rendered obvious, suggested, or even implied by any of the prior art reel storage devices, either alone or in any combination thereof.

It is another object of the present invention to provide a new audio and video cable storage organizer which may be easily and efficiently manufactured and marketed.

It is a further object of the present invention to provide a new audio and video cable storage organizer which is of a durable and reliable construction.

An even further object of the present invention is to provide a new audio and video cable storage organizer which is susceptible of a low cost of manufacture with regard to both materials and labor, and which accordingly is then susceptible of low prices of sale to the consuming public, thereby making such audio and video cable storage organizers economically available to the buying public.

Still yet another object of the present invention is to provide a new audio and video cable storage organizer which provides in the apparatuses and methods of the prior art some of the advantages thereof, while simultaneously overcoming some of the disadvantages normally associated therewith.

Still another object of the present invention is to provide a new audio and video cable storage organizer for storing excess audio and video cable which includes a housing within which a plurality of reels are rotatably mounted such that a length of cable may be stored upon one of such reels and extended therefrom through a slot in the housing to be connected to an electrical device, such as a cable box, a VCR, or the like.

Yet another object of the present invention is to provide a new audio and video cable storage organizer in which the cables are electrically connected through a switching arrangement that allows for operation of selected devices in the absence of other devices.

Even still another object of the present invention is to provide a new audio and video cable storage organizer which further includes an auxiliary input for connecting video games to the television, and audio cable storage reels for storing interconnected audio cable.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of an audio and video cable storage organizer as installed to the rear of a television set.

FIG. 2 is a front elevation view of the present invention.

DESCRIPTION OF THE PREFERRED EMBODIMENT

Figure 3:
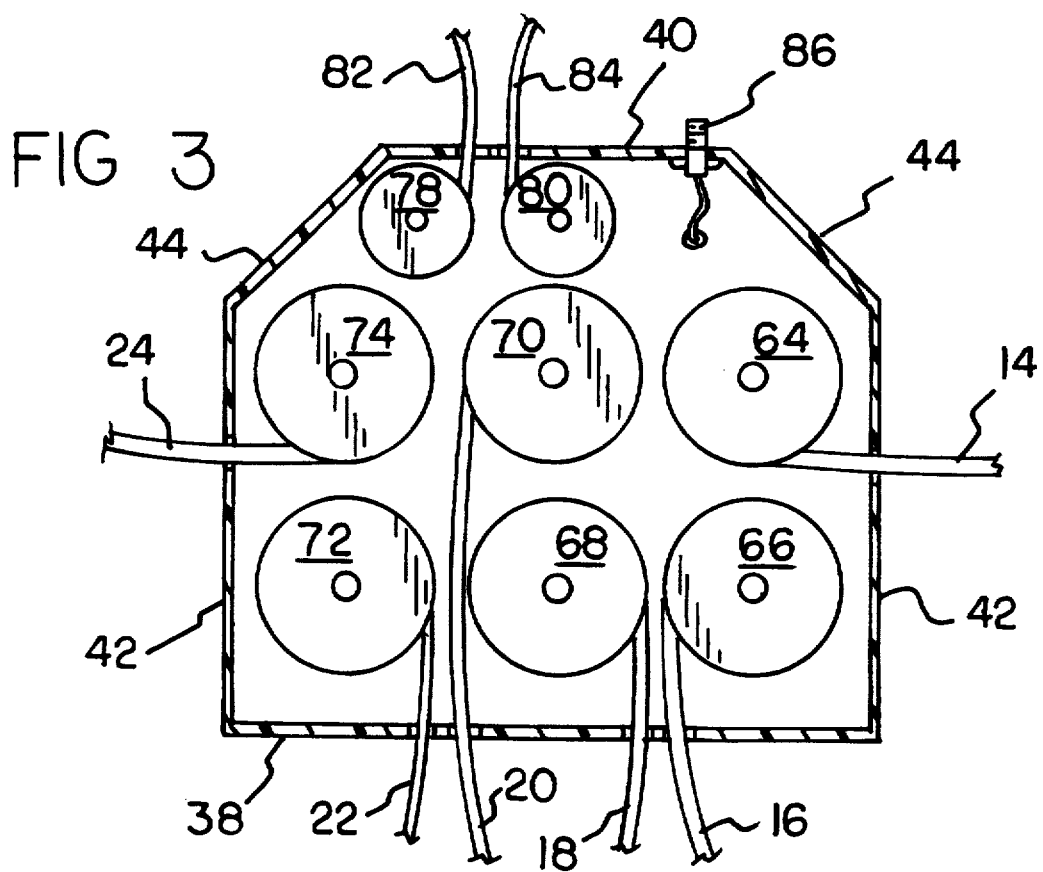
FIG. 3 is a cross sectional view taken along line 3—3 of FIG. 1.

With reference now to the drawings, and in particular to FIGS. 1-6 thereof, a new audio and video cable storage organizer embodying the principles and concepts of the present invention and generally designated by the reference numeral 10 will be described.

From an overview standpoint, the audio and video cable storage organizer 10 generally comprises a housing 12 in which a plurality of reels are rotatably mounted. Each reel supports thereon a length of coaxial cable which may be extended therefrom such that the cable may be electrically connected to an electronic device such as a cable box, a VCR, or the like.

Figure 5:
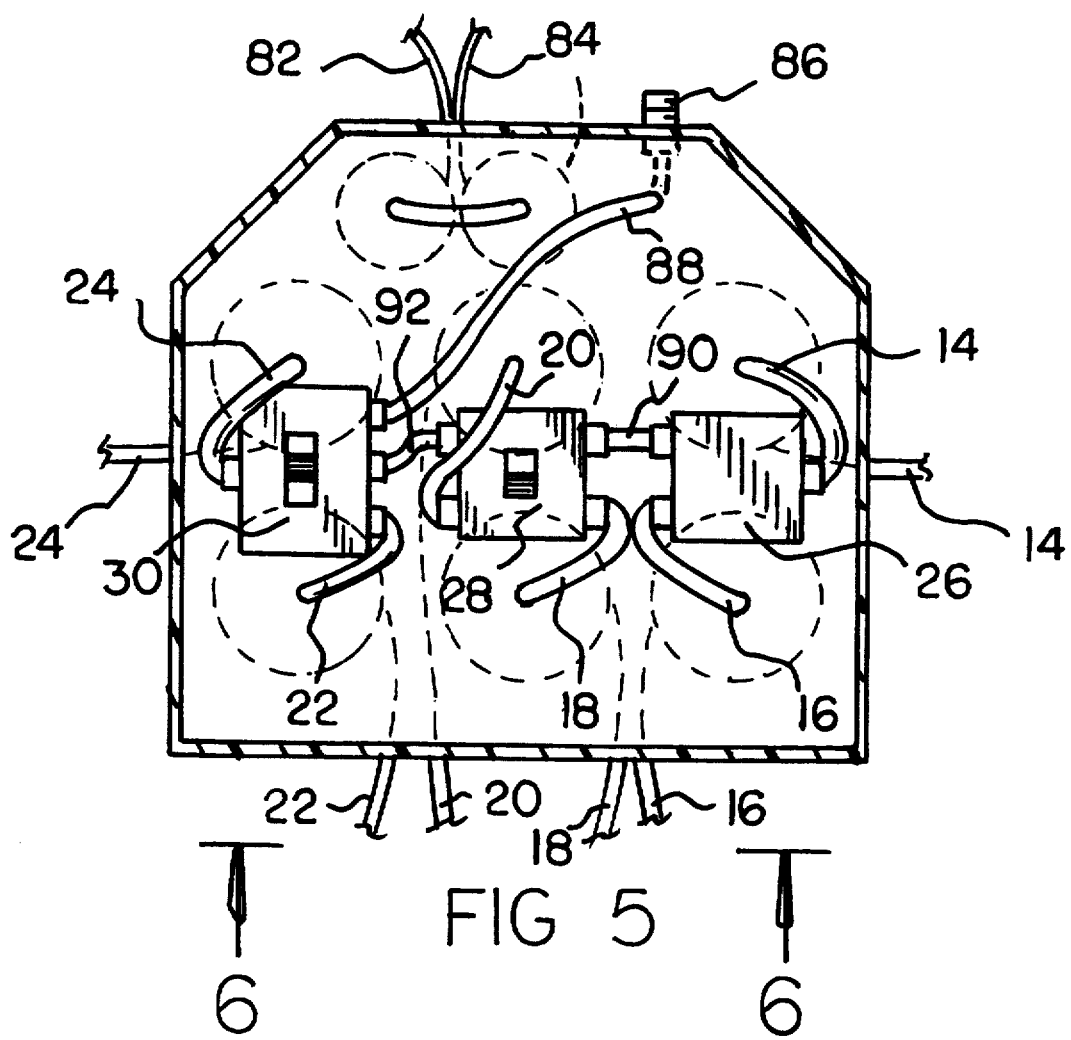
FIG. 5 is an even further cross sectional view of the invention taken along line 5—5 of FIG. 4.

The cables include a main input cable 14, a to-cable-box cable 16, a from-cable-box cable 18, a to-VCR cable 20, a from-VCR cable 22, and a to-TV cable 24, as best illustrated in FIG. 3. The cables 14-24 are interconnected through a splitter 26, a two-way switched input splitter 28, and a three-way switched input 30, as shown in FIG. 5. The interconnection devices 26-30 allow for operation of selected devices in the absence of other devices in a manner which will subsequently be described in greater detail.

In addition, the audio and video cable storage organizer 10 is provided with a from-cable-box audio cable 32 which is stored upon an appropriate reel and interconnected with a to-stereo audio cable 34, as well as an auxiliary input 36 which is interconnected with the cables 14-24 such that a video game or the like may be present in the circuit.

In use, the audio and video cable storage organizer 10 provides for a convenient means of organizing the plurality of cables typically utilized to interconnect various electrical devices behind a television 38.

More specifically, it will be noted that the audio and video cable storage organizer 10 comprises a housing 12 having a bottom wall 38 spaced from a top wall 40. The bottom wall 38 and the top wall 40 are joined in such spaced relationship by lower side walls 42 which project from the bottom wall and continue into upper side walls 44 coupled to the top wall 40. The upper side walls 44 are inwardly angled with respect to the lower side walls 42 such that a front elevation view of the housing 12 illustrates a substantially rectangular shape with angled corners. The housing 12 is shaped in this manner so that an efficient use of the space contained therein may be accomplished and to reduce the volume of space necessary for the device.

Figure 4:
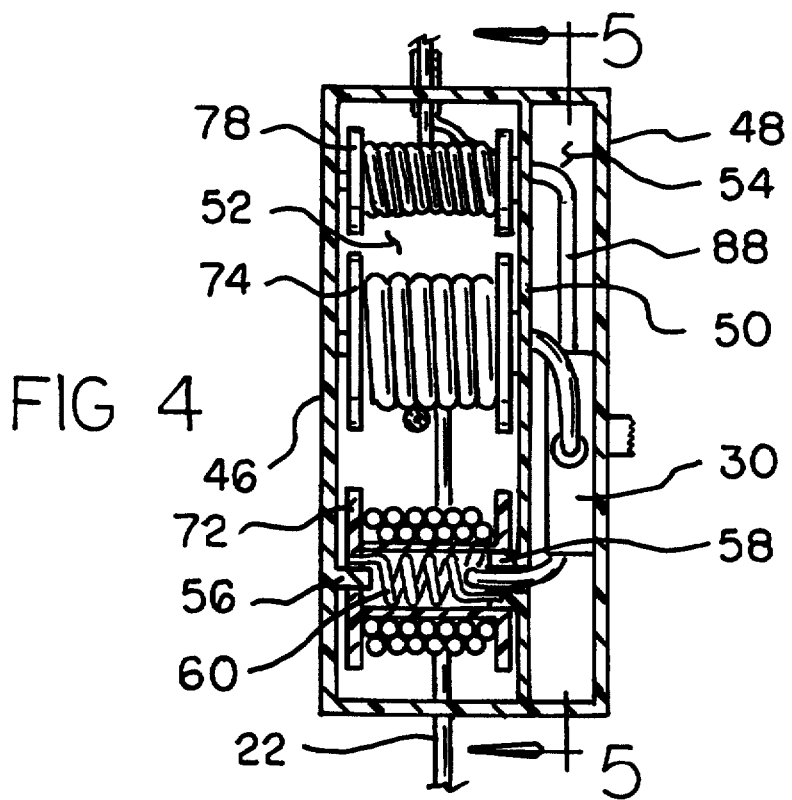
FIG. 4 is a further cross sectional view taken along line 4—4 of FIG. 2.

The housing 12 is completed by a front wall 46 orthogonally joined to the perimeter walls 38-44, and a rear wall 48 joined in a similar manner to the perimeter walls in a spaced relationship to the front wall. Positioned between the front wall 46 and the rear wall 48 in a substantially parallel relationship thereto, is an interior wall 50 which cooperates with the front wall 46 to define a reel compartment 52 and further cooperates with the rear wall 48 to define an interconnection compartment 54, as best illustrated in FIG. 4. In the preferred embodiment, the reel compartment 52 is provided with a volume approximately twice that of a volume of the interconnection compartment 54.

With further reference to FIG. 4, it can be shown that the front wall 46 is provided with a plurality of solid projections 56, with only one of such projections being labelled in the Figure, however. The solid projections 56 project inwardly into the reel compartment 52 and are aligned with a plurality of hollow projections 58 projecting inwardly from the interior wall 50. Again, only one of such hollow projections 58 is labelled in FIG. 4. The projections 56–58 cooperate to rotatably support a reel thereon, with a torsion spring 60 connected to both the reel and the hollow projection to impart a rotational tendency to such reel. Again, it should be noted that each of the reels is provided with substantially similar mounting structure as described for the single reel in FIG. 4.

Referring to FIG. 3, it can be shown that the reels include a main input reel 64 upon which a main input cable 14 is wound, a to-cable-box reel 66 upon which a to-cable-box cable 16 is wound, a from-cable-box reel 68 upon which a from-cable-box cable 18 is wound, a to-VCR reel 70 upon which a to-VCR cable 20 is wound, a from-VCR reel 72 upon which a from-VCR cable 22 is wound, and lastly, a to-TV reel 74 upon which a to-TV cable 24 is wound. Each of the reels 64–74 is provided with a radial opening which allows the respective cables 14–24 to project through the hollow projection 58 into the interconnection compartment 54, as shown for the from-VCR reel 72 in FIG. 4. This arrangement provides for the organized storage of each of the cables 14–24 upon the respective reels 64–74, with the torsion spring 60 providing the tendency to reel in excess cable.

Figure 6:
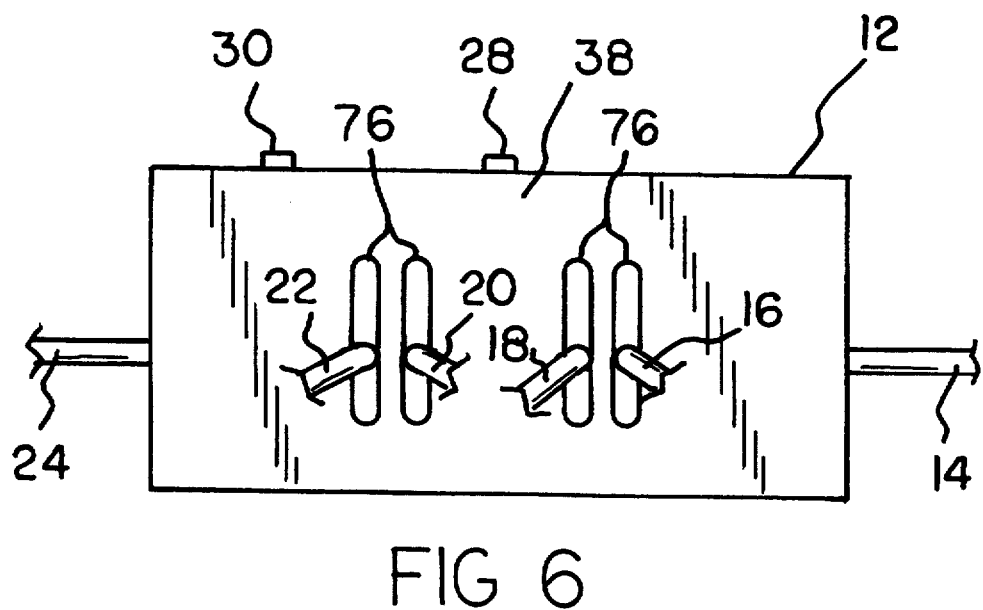
FIG. 6 is a bottom plan view of the invention.

As best illustrated in FIG. 6, the housing 12 is provided a plurality of slots 76 through which the cables 14–24 may exit the housing. Although illustrated in FIG. 6 for only four of such cables 16–22, it is to be understood that the housing 12 is provided with slots for the remaining cables 14 and 24.

In addition to the video cable reels 64–74, a pair of audio reels 78, 80 are also mounted within the reel compartment 52. The reels 78, 80 are mounted in a substantially similar manner as the video reels 64–74 such that the torsion spring 60 will tend to wind cable thereon. The reels 78, 80 include a from-cable-box audio reel 78 upon which a length of from-cable-box audio cable 82 is wound, and a to-stereo audio reel 80 upon which a length of to-stereo cable 84 may be stored. The cables 82, 84 are interconnected within the interconnection compartment 54, as best illustrated in FIG. 5.

An auxiliary input 86 is mounted to the top wall 40 of the housing 12 and is connected to an auxiliary cable 88 which projects into the interconnection compartment 54, as best illustrated in FIGS. 3 and 4.

FIG. 5 illustrates the interconnection between the cables 14–24 within the interconnection compartment 54 and it can be seen from this Figure that a splitter 26, a two-way switched input splitter 28, and a three-way switched input 30 are positioned therewithin. The main input cable 14 is connected to the splitter 26 which splits the signal between a first output 90 and the two-cable-box cable 16 which may be connected to the input of a cable converter box or the like.

The two-way switched input splitter 28 is a splitter provided with two inputs which may be selectively and exclusively operated. The first input of the two-way switched input splitter 28 is connected to the first output 90 of the splitter 26. The second input of the two-way switched input splitter 28 is connected to the from-cable-box cable 18. An unlabelled switch forming a part of the two-way switched input splitter 28 may be selectively operated by a user to allow a signal from either the first output 90 or the from-cable-box cable 18 to be split into two paths. In this manner, a person utilizing the audio and video cable storage organizer 10 who does not utilize a cable converter box or the like may disable the cable-box cables 16–18, whereas a person utilizing the cable box may route the input signal exclusively through the cable box.

The two-way switched input splitter 28 splits the chosen input signal between a second output 92 and the to-VCR cable 20. The signal travels from the second output 92 to one of three inputs on the three-way switched input 30. Another of the inputs on the three-way switched input 30 is connected to the from-VCR cable 22 with the remaining input being connected to the auxiliary cable 88. The three-way switched input 30 allows a user to select between one of the three inputs provided thereon such that a person utilizing the audio and video storage organizer 10 without a VCR may disconnect the VCR cables 20–22 from the circuit by selecting the second output 92 of the two-way switched input splitter 28 as the input. In addition, should the auxiliary input 86 be utilized for a video game or the like, the three-way switched input 30 may be switched to utilize the auxiliary cable 88 as the input. The output of the three-way switched input 30 is connected to the to-TV cable 24 which completes the circuit and allows for transfer of the signal from the main input cable 14, which is connected to a cable outlet or the like, through the appropriate devices, such as the cable converter box or VCR mentioned heretofore, to the television 38.

In use, the audio and video cable storage organizer 10 provides for a convenient means of organizing the plurality of cables typically utilized to interconnect various electrical devices behind a television 38.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A audio and video cable storage organizer comprising:

a housing having a plurality of slots extending therethrough;

a main input reel rotatably mounted within said housing;

a main input coaxial cable stored upon said main input reel and projecting through one of said slots exterior of said housing;

a to-TV reel rotatably mounted within said housing; and, a to-TV cable stored upon said to-TV reel and projecting through another of said slots exterior of said housing, said cables being electrically interconnected.

2. The audio and video cable storage organizer of claim 1, and further comprising:

a to-cable-box reel rotatably mounted within said housing;

a to-cable-box cable stored upon said to-cable-box reel and projecting through a further one of said slots exterior of said housing;

a from-cable-box reel rotatably mounted within said housing; and, a from-cable-box cable stored upon said from-cable-box reel and projecting through still another one of said slots exterior of said housing, said to-cable-box cable being in electrical communication with said main input cable, and said from-cable-box cable being in electrical communication with said to-TV cable.

3. The audio and video cable storage organizer of claim 1, and further comprising a to-VCR reel rotatably mounted within said housing;

a to-VCR cable stored upon said to-VCR reel and projecting through an even further one of said slots exterior of said housing;

a from-VCR reel rotatably mounted within said housing; and, a from-VCR cable stored upon said from-VCR reel and projecting through still yet another of said slots exterior of said housing, said to-VCR cable being in electrical communication with said from-cable-box cable, and said from-VCR cable being in electrical communication with said to-TV cable.

4. The audio and video cable storage organizer of claim 3, and further comprising a splitter having a main input and first and second splitter outputs, with said main input cable being electrically connected to said main input;

a two-way switched splitter having first and second switched splitter inputs, and further having first and second switched splitter outputs, with said first splitter output of said splitter being electrically connected to said first switched splitter input, said to-cable-box cable being electrically coupled to said first splitter output of said splitter, said from-cable-box cable being electrically connected to said first switched splitter input; and, a three-way switched input having first, second, and third three-way switched inputs, with said second three-way switched input being electrically connected to said first switched splitter output, said second switched splitter output being electrically connected to said to-VCR cable, said from-VCR cable being electrically connected to said third three-way switched input, and said three-way switched input further having a main output, with said to-TV cable being electrically connected to said main output.

5. The audio and video cable storage organizer of claim 4, and further comprising an auxiliary input mounted to said housing and electrically connected to said first three-way switched input.

6. The audio and video cable storage organizer of claim 5, and further comprising a from-cable-box audio reel rotatably mounted within said housing;

a from-cable-box audio cable stored upon said from-cable-box reel and projecting through still yet a further one of said slots exterior of said housing;

a to-stereo reel rotatably mounted within said housing; and, a to-stereo audio cable stored upon said to-stereo reel and projecting through still yet another further one of said slots exterior of said housing, said audio cables being interconnected together.

7. The audio and video cable storage organizer of claim 6, wherein said reels are each provided with a torsion spring which tends to rewind said cable onto each respective reel.

* * * * *